(12) United States Patent
Jung

(10) Patent No.: US 7,801,147 B2
(45) Date of Patent: Sep. 21, 2010

(54) APPARATUS AND METHOD FOR PROVIDING USER DATAGRAM PROTOCOL/INTERNET PROTOCOL-BASED A1 INTERFACE IN A MOBILE COMMUNICATION SYSTEM

(75) Inventor: Byeong-Gi Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 845 days.

(21) Appl. No.: 11/704,149

(22) Filed: Feb. 8, 2007

(65) Prior Publication Data

US 2007/0201488 A1 Aug. 30, 2007

(30) Foreign Application Priority Data

Feb. 8, 2006 (KR) .................... 10-2006-0011992

(51) Int. Cl.
- H04L 12/56 (2006.01)
- H04L 12/28 (2006.01)
- H04J 3/16 (2006.01)
- H04J 3/22 (2006.01)

(52) U.S. Cl. .............. 370/395; 370/352; 370/401; 370/467

(58) Field of Classification Search ......... 370/310–410, 370/465–522; 455/426–433, 461–522
See application file for complete search history.

(56) References Cited

U.S. PATENT DOCUMENTS

| | | | |
|---|---|---|---|
| 6,515,997 B1 | 2/2003 | Feltner et al. | |
| 7,203,166 B1 * | 4/2007 | Chu et al. | 370/230 |
| 7,327,703 B2 * | 2/2008 | Chang | 370/329 |
| 7,469,384 B2 * | 12/2008 | Thompson et al. | 715/758 |
| 7,573,905 B2 * | 8/2009 | Benedyk et al. | 370/467 |
| 7,586,922 B2 * | 9/2009 | Sivalingham et al. | 370/395.52 |
| 7,616,659 B2 * | 11/2009 | Benedyk et al. | 370/467 |
| 2003/0007496 A1 * | 1/2003 | Brown et al. | 370/401 |
| 2005/0232235 A1 * | 10/2005 | Sharma et al. | 370/352 |
| 2008/0019293 A1 * | 1/2008 | Chang et al. | 370/310 |
| 2009/0129301 A1 * | 5/2009 | Belimpasakis | 370/310 |
| 2009/0141674 A1 * | 6/2009 | Masuda et al. | 370/329 |

FOREIGN PATENT DOCUMENTS

| | | |
|---|---|---|
| KR | 100612698 | 8/2006 |
| KR | 1020070032535 | 3/2007 |

* cited by examiner

*Primary Examiner*—M. Phan
(74) *Attorney, Agent, or Firm*—The Farrell Law Firm, LLP

(57) ABSTRACT

A system and method for providing a UDP/IP (User Datagram Protocol/Internet Protocol)-based A1 interface in a mobile communication system are provided, in which a BSC controls an A1 interface connection by an A1 interface message using the UDP/IP as a data link layer protocol during communicating with a MSC, and the MSC controls the A1 interface connection by the A1 interface message using the UDP/IP as the data link layer protocol during communicating with the BSC.

12 Claims, 8 Drawing Sheets

| INFORMATION ELEMENTS | SECTION REFERENCE | ELEMENT DIRECTION | TYPE |
|---|---|---|---|
| A1 VERSION | 710 | BSC ↔ MSC | M |
| CONNECTION TYPE | 715 | BSC ↔ MSC | M |
| DESTINATION LOCAL REFERENCE | 720 | BSC ↔ MSC | M |
| SOURCE LOCAL REFERENCE | 725 | BSC ↔ MSC | M |
| SOURCE IP ADDRESS | 730 | BSC ↔ MSC | M |
| RETRANSMIT NUMBER | 735 | BSC ↔ MSC | M |
| ACK REQUIRED | 740 | BSC ↔ MSC | O |

FIG.7A

| 0 | 1 | 2 | 3 | 4 | 5 | 6 | 7 | OCTET | REF. |
|---|---|---|---|---|---|---|---|---|---|
| ⇒ A1 VERSION = [ 00 H ~FF H ] ||||||||| 1 | 710 |
| ⇒ CONNECTION TYPE =<br>01H : CONNECTION REQUEST<br>02H : CONNECTION CONFIRM<br>03H : CONNECTION REFUSE<br>06H : DATA TRANSFER<br>09H : CONNECTION-LESS DATA TRANSFER<br>10H : INACTIVITY TEST ||||||||| 1 | 715 |
| (MSB) ||||||||| 1 | |
| ⇒ DESTINATION LOCAL REFERENCE = { 00 00 00 00 H TO FF FF FF FF H } ||||||||| 2 | 720 |
| ||||||||| 3 | |
| ||||||||| 4 | |
| (MSB) ||||||||| 1 | |
| ⇒ SOURCE LOCAL REFERENCE = { 00 00 00 00 H TO FF FF FF FF H } ||||||||| 2 | 725 |
| ||||||||| 3 | |
| ||||||||| 4 | |
| (MSB) ||||||||| 1 | |
| ⇒ SOURCE IP ADDRESS (IPv4) = { 00 00 00 00 H TO FF FF FF FF H } ||||||||| 2 | 730 |
| ||||||||| 3 | |
| ||||||||| 4 | |
| ⇒ RETRANSMIT NUMBER = [ 0 TO F ] |||| ⇒ ACK REQUIRED ₩ [ 0 OR 1 ] |||| 1 | 735<br>740 |

FIG.7B

APPARATUS AND METHOD FOR PROVIDING USER DATAGRAM PROTOCOL/INTERNET PROTOCOL-BASED A1 INTERFACE IN A MOBILE COMMUNICATION SYSTEM

PRIORITY

This application claims priority under 35 U.S.C. §119 to a Korean Patent Application filed in the Korean Intellectual Property Office on Feb. 8, 2006 and assigned Serial No. 2006-11992, the contents of which are incorporated herein by reference.

BACKGROUND OF THE INVENTION

1. Field of the Invention

The present invention relates generally to an A1 interface in a mobile communication system, and in particular, to an apparatus and method for providing an User Datagram Protocol/Internet Protocol (UDP/IP) based A1 interface.

2. Description of the Related Art

FIG. 1 is a schematic diagram illustrating an A1 and an A2 interface between the Base Station Controllers (BSCs) and a Mobile Switching Center (MSC) in a conventional mobile communication system.

In FIG. 1, existing standards for mobile communication systems (e.g. $3^{rd}$ Generation Partnership Project 2 (3GPP2) A.S0012-C_v1.0_050224) clarify that a Signaling System 7 (SS7) or an IP-based Stream Control Transmission Protocol/User Datagram Protocol (SCTP/UDP) is used as a communication protocol for A1 interfaces using E1/T1 links in a hardware layer between BSCs 110 and 120 and an MSC 130.

The A1 interface carries signaling information between the BSCs 110 and 120 and the MSC 130 to control user traffic for which the A2 interface provides a path. Depending on system configuration, the BSCs 110 and 120 may include Base Transceiver Systems (BTSs), respectively, and the MSC 130 also may have a Media Gateway Controller (MGC) and a Media Gateway (MG) 135. In a structure where a media processor and a media controller are separately configured, the MGC serves as the media controller and the MG 135 serves as the media processor. The MGC 130 uses the Megaco Protocol in H.248.

FIG. 2 is a schematic diagram illustrating a protocol stack for the A1 interface in a conventional mobile communication system.

In FIG. 2, the A1 interface uses the E1/T1 links 210 in a physical layer and the SS7 as a data link layer protocol. The Signaling Connection Control Part/Message Transfer Part (SCCP/MTP) 250 and 255 is a signal control-related protocol of the SS7.

The Base Station Application Parts (BSAPs) 220 and 225 are divided into a Direct Transfer Application Part (DTAP) and a Base Station Management Application Part (BSMAP). The DTAP is a protocol by which the BSCs 110 and 120 send messages received from the Mobile Stations (MSs) to the MSC 130. The BSMAP is a protocol for processing A1 interface messages between the BSCs 110 and 120 and the MSC 130.

The SS7 manages links, but with limitations to its management range. The SCTP also has the drawbacks of delay and low rate because it is connection-oriented.

FIG. 3 is a flow diagram illustrating a procedure for establishing an A1 interface connection in a conventional mobile communication system.

In FIG. 3, the A1 interface connection setup procedure between a BSC SCCP and an MSC SCCP is divided into a connection setup step 310, a data transmission step 320, and a connection release step 330. The connection setup 310 and the connection release 330 may cause delay.

Along with the introduction of the concept of an ALL(All) IP (Internet Protocol) and the evolution of the mobile communication system to the ALL IP, the development trend is that the MSC 130 supports transmission of a large volume of data at higher data rates and the BSCs 110 and 120 are miniaturized. In this context, one MSC 130 needs to accommodate tens of thousands of BSCs.

However, a Transmission Control Protocol (TCP) or an SCTP, which supports connection management in an IP network, suffers from increased delay, increased processing overhead, and weak multimedia support.

Accordingly, there exists a need for a method for reducing delay and overhead and enforcing support for multimedia by use of a non-connection-oriented protocol which takes advantage of the connection-oriented protocol in terms of connection setup speed and transmission rate and whose reliability is ensured owing to the development of networks and hardware, despite its probability of data loss attributed to the non-connection orientation.

SUMMARY OF THE INVENTION

An object of the present invention is to substantially solve at least the above problems and/or disadvantages and to provide at least the advantages below. Accordingly, an object of the present invention is to introduce a non-connection-orientation to an A1 interface in a mobile communication system.

Another object of the present invention is to provide a novel A1 interface message that fulfills an A1 interface requirements using a non-connection oriented protocol, such as UDP/IP.

According to one aspect of the present invention, there is provided a system for providing a UDP/IP-based A1 interface in a mobile communication system, in which a BSC controls an A1 interface connection by an A1 interface message using UDP/IP as a data link layer protocol during communication with, an MSC, and the MSC controls the A1 interface connection by the A1 interface message using the UDP/IP as the data link layer protocol during communication with the BSC.

According to another aspect of the present invention, there is provided a method of an MSC for providing an UDP/IP-based A1 interface in a mobile communication system, in which the MSC establishes a data link layer connection using the UDP/IP with a BSC, and manages the connection by an A1 interface message using the UDP/IP, for connection control with the BSC.

BRIEF DESCRIPTION OF THE DRAWINGS

The above and other objects, features and advantages of the present invention will become more apparent from the following detailed description when taken in conjunction with the accompanying drawings in which:

FIGS. 7A and 7B illustrate information elements of a field added to an existing A1 interface message in order to support the UDP/IP-based A1 interface in the mobile communication system according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 4:
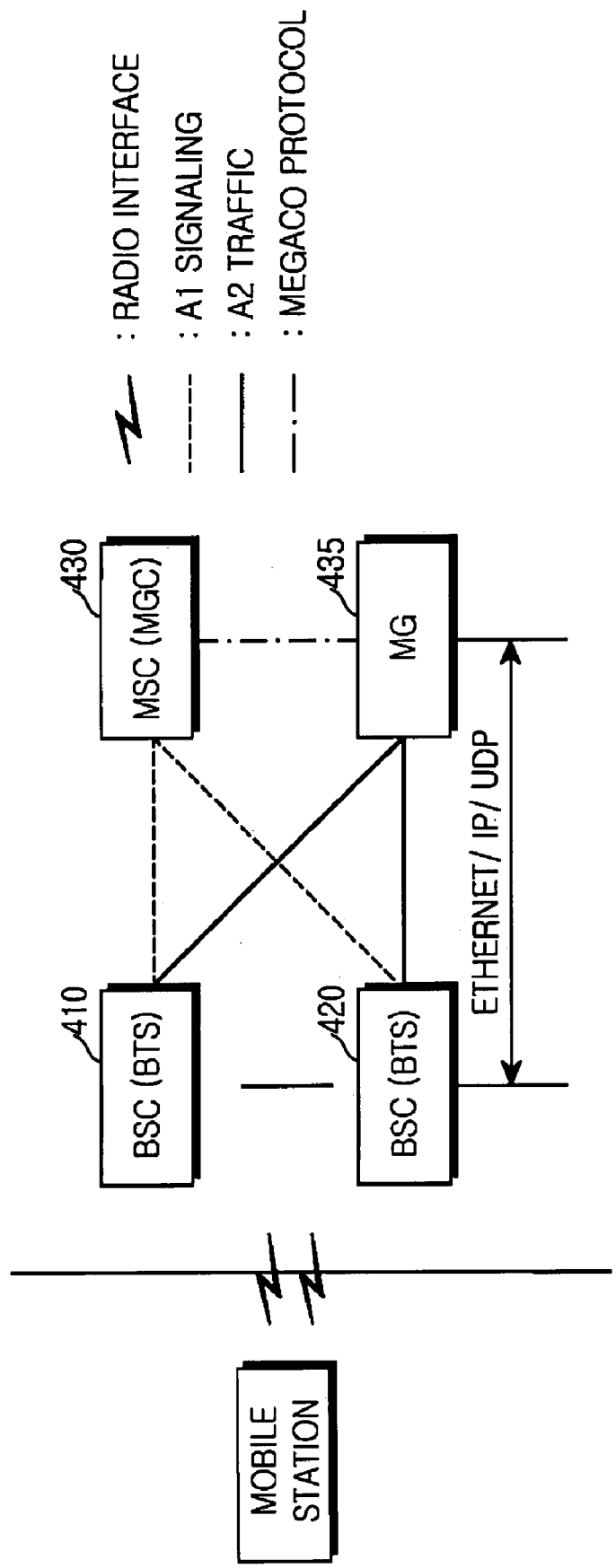
FIG. 4 is a schematic diagram illustrating an A1 interface between the BSCs and a MSC in a mobile communication system according to the present invention.

FIG. 4 illustrates A1 interfaces between BSCs and an MSC in a mobile communication system according to the present invention.

In FIG. 4, an A interface including A1 interfaces for delivering signaling information and A2 interfaces for delivering user traffic between the BSCs 410 and 420 and an MSC 430 uses Ethernet in a physical layer in the mobile communication system according to the present invention.

The BSCs 410 and 420 may include the BTSs and the MSC 430 may have a MGC 430 and an MG 435 depending on the system configuration.

Figure 5:
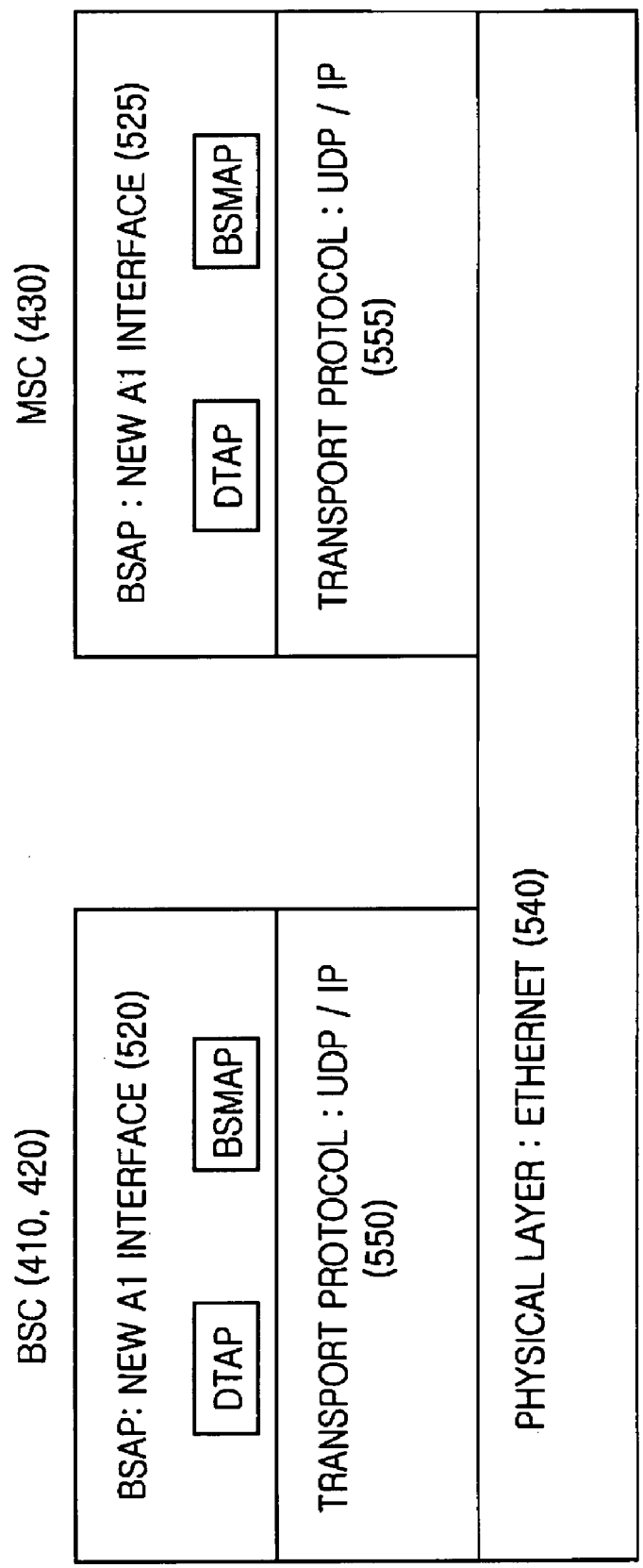
FIG. 5 is a schematic illustrating a protocol stack for the A1 interface in the mobile communication system according to the present invention.

FIG. 5 illustrates a protocol stack for the A1 interface in the mobile communication system according to the present invention.

In FIG. 5, compared to the conventional protocol stack for the A1 interface in which the E1/T1 links 210 are used in the physical layer and a SS7 is used as a protocol in the data link layer, the physical layer and the data link layer are based on an Ethernet 540 and the UDP/IP 550 and 555, respectively, in the present invention. The BSAPs 520 and 525 are responsible for connection setup as an A1 interface message processor and as the conventional connection setup is performed by the SS7.

Figure 1:
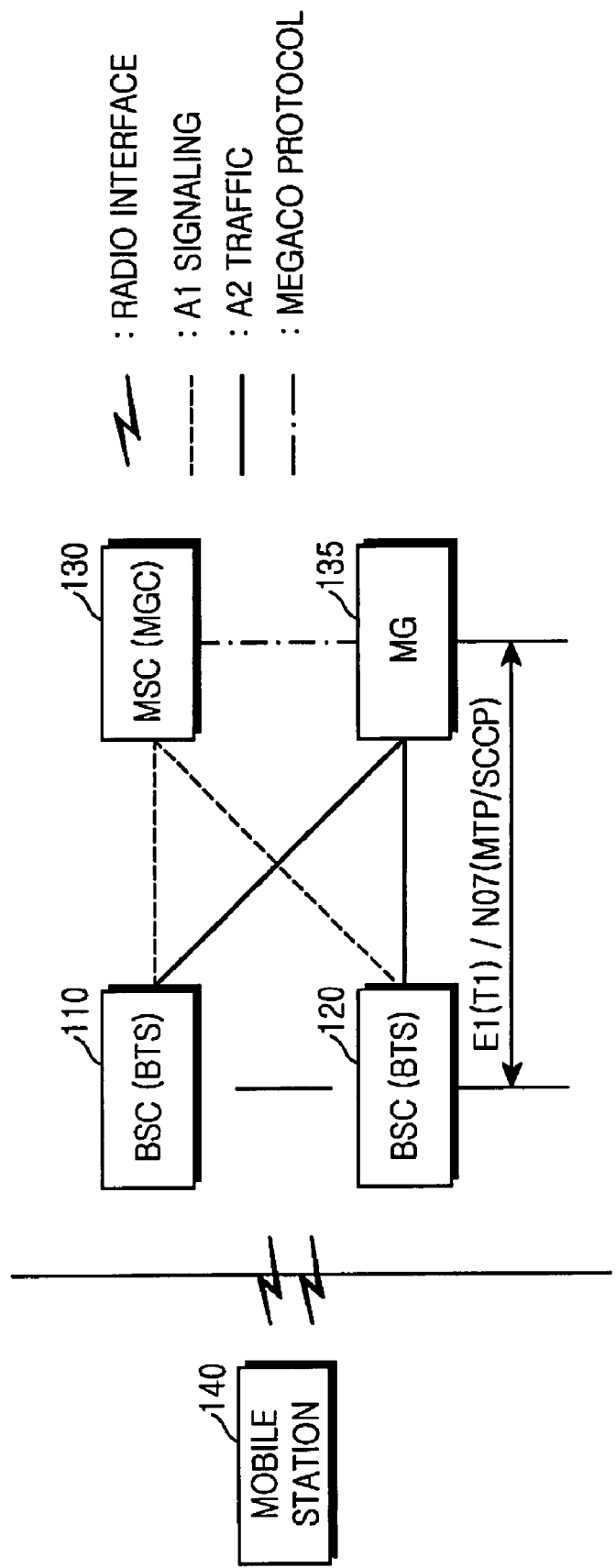
FIG. 1 illustrates a schematic diagram of A1 and A2 interfaces between the BSCs and a MSC in a conventional mobile communication system.
Figure 2:
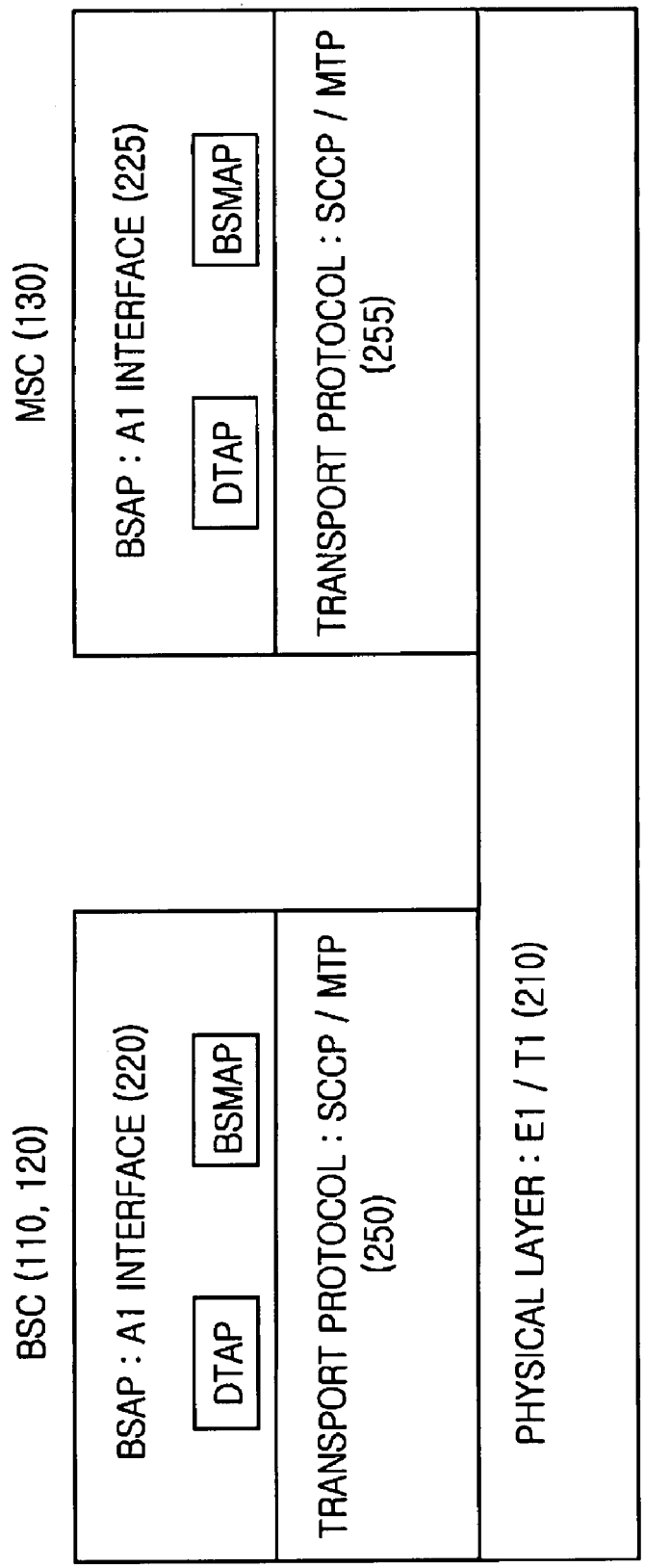
FIG. 2 illustrates a schematic diagram of a protocol stack for the A1 interface in a conventional mobile communication system.
Figure 3:
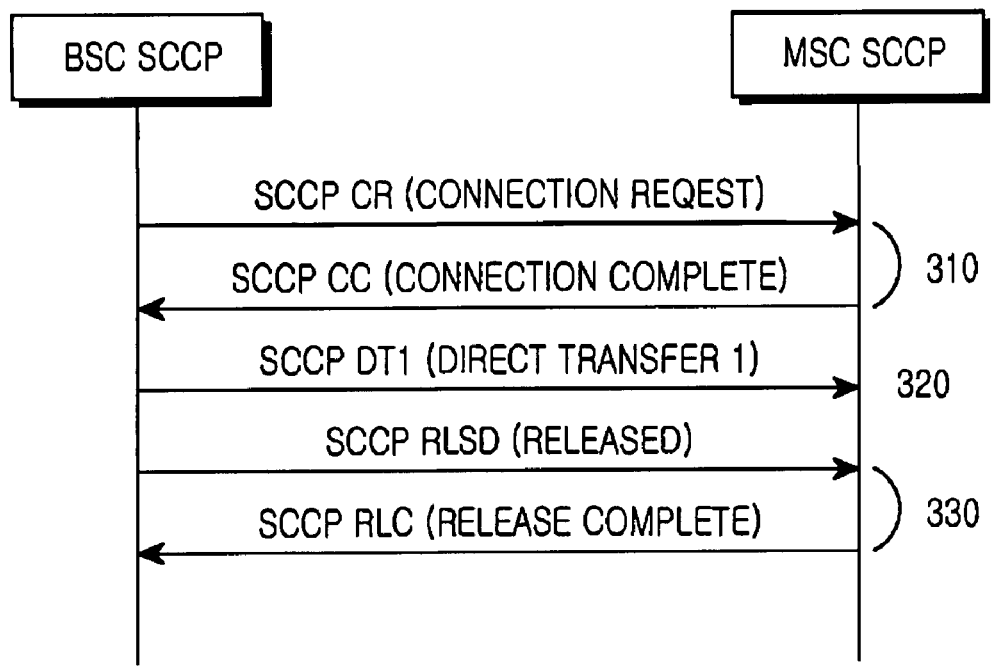
FIG. 3 is a schematic diagram illustrating a procedure for establishing an A1 interface connection in a conventional mobile communication system.

A1 interface messages are used for a call connection after a SCCP-based connection setup, as illustrated in FIG. 3 in the conventional technology. Therefore, the higher-layer BSAPs 520 and 525 are not involved in the connection setup.

Yet, since the UDP/IP layers 550 and 555 do not operate in the above connection-oriented manner, the BSAPs 520 and 525 have to manage a connection setup. For this purpose, a new A1 interface message is defined. The new A1 interface message is configured by adding a new field for connection setup management to the existing A1 interface message defined by 3GPP2 A. S0012-C.

Figure 6:
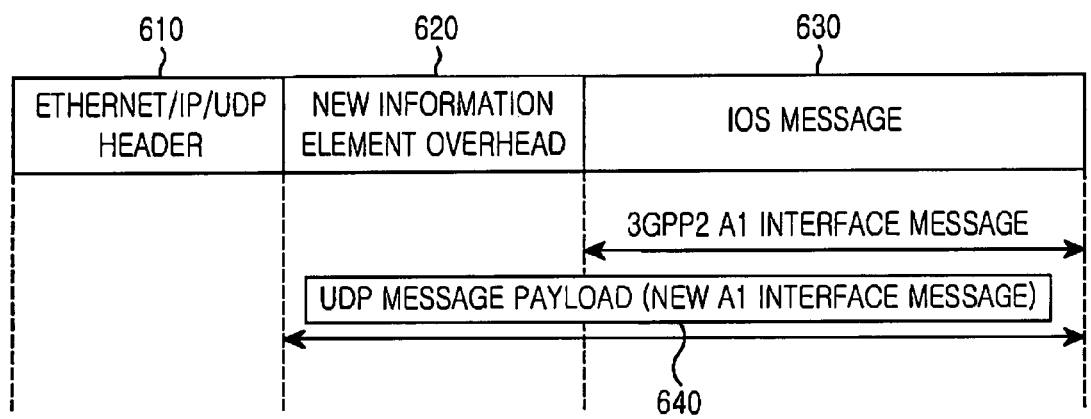
FIG. 6 is a schematic illustrating a packet structure for an UDP/IP-based A1 interface in the mobile communication system according to the present invention.

FIG. 6 illustrates a packet structure for the UDP/IP-based A1 interface in the mobile communication system according to the present invention. Here, the A1 interface message generically refers to a message including an Interoperability Specification (IOS) message in payload.

In FIG. 6, an Ethernet/IP/UDP header 610 is a header added in the physical layer and the data link layer of the A1 interface. A new information element overhead 620 provides information for processing a connection setup for which the SS7 is responsible in the conventional technology. An IOS message 630 is a message processed in the BSAPs 4230 and 425 of the A interface complying with the standards.

A new A1 interface message 640 of the present invention includes the overhead 620 in addition to the existing IOS message 630.

FIG. 7A illustrates the field added to the existing A1 interface message in order to support the UDP/IP-based A1 interface in the mobile communication system according to the present invention. The field is added to any A1 interface message defined by the standards. FIG. 7B illustrates the added field in the form of a standard.

In FIGS. 7A and 7B, an A1 version 710 identifies the version of the A1 interface message according to the present invention. The compatibility of the A1 interface message can be determined based on the version.

A Connection Type 715 specifies the type of a connection setup for which the A1 interface message will be used. A Destination Local Reference 720 is a destination key value that identifies a call between the BSCs 410 and 420 and the MSC 430. The destination key value is included as a destination identifier in all messages associated with the call so that the BSCs 410 and 420 and the MSC 430 can identify the call.

A Source Local Reference 725 is a source key value that identifies a call between the BSCs 410 and 420 and the MSC 430. The source key value is included as a source identifier in all messages associated with the call so that the BSCs 410 and 420 and the MSC 430 can identify the call.

A Source IP address 730 is the IP address of a source. It can be used as a call identifier together with the Source Local Reference 725.

A Retransmit Number 735 provides the count of retransmissions in case of loss of the UDP/IP-based A1 interface message in the present invention. In operation, when the same message is sent a plurality of times, the count of transmissions is written in this field. For an initial message transmission, the Retransmit Number 735 is set to 0x00 and increases by 1 each time the message is retransmitted due to transmission failure.

An Ack Required 740 is used to request transmission of a response message in case of loss of the UDP/IP-based A1 interface message in the present invention. Among the existing A1 interface messages for call setup, the Ack Required 740 is set to 1 for a connection-oriented message and set to 0 for a non-connection-oriented message. The Ack Required 740 is optional and the other fields are mandatory to the A1 interface message, as illustrated in FIG. 7A. In FIG. 7A, M represents mandatory and O represents optional.

As noted above, since connection setup information is included in the new A1 interface message processed in the BSAPs 520 and 525, there is no need for SCCP messages used for call release, such as an SCCP RLSD (ReLeaSeD) and an SCCP RLC (ReLease Complete) in the conventional SS7.

Figure 8:
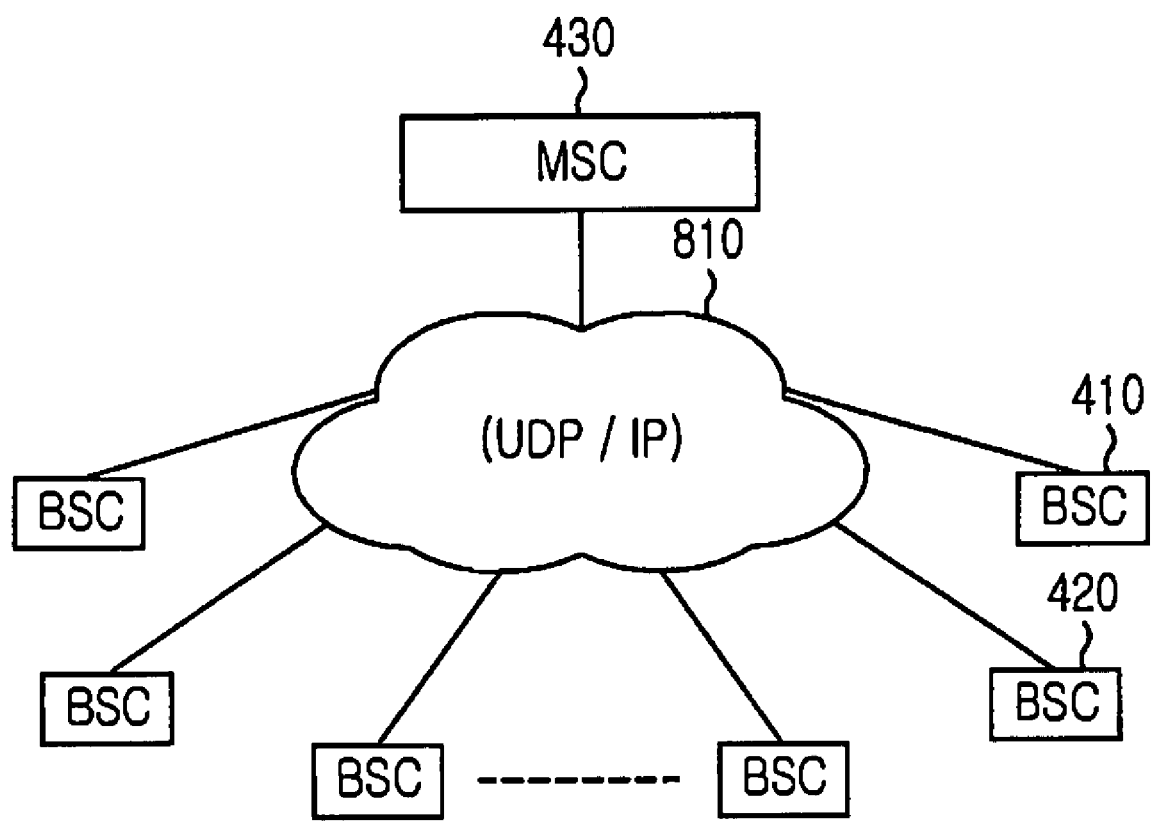
FIG. 8 illustrates a network configuration in the mobile communication system according to the present invention.

FIG. 8 illustrates a network configuration in the mobile communication system according to the present invention. Here, A1 interfaces between a MSC 430 and the BSCs 410 and 420 are converted to be UDP/IP-based. Moreover, the MSC 430 can deploy the BSCs 410 and 420 with no limitations to the number of connections over the UDP/IP-based network 810.

As described above, the present invention provides an apparatus and method for using a UDP/IP-based communication protocol for an A1 interface between a BSC and a MSC. Therefore, call service can be advantageously provided to many users with no limitations to physical links.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for providing a signaling interface between a Base Station Controller (BSC) and a Mobile Switching Center (MSC) in a mobile communication system, comprising:
the Base Station Controller (BSC) for controlling an A1 interface connection by an A1 interface message using a UDP/IP (User Datagram Protocol/Internet Protocol) as a data link layer protocol during communication with the Mobile Switching Center (MSC); and
the MSC for controlling the A1 interface connection by the A1 interface message using UDP/IP as the data link layer protocol during communication with the BSC,
wherein the UDP/IP-based A1 interface message is configured to include a new field for managing a connection setup in addition to an existing A1 interface message, and
wherein the new field includes an A1 version indicating the version of the UDP/IP-based A1 interface message, a connection type describing the type of the connection setup, a destination key value for identifying a call destination, a source key value for identifying a call source, an address of the call source, a retransmission number, and information indicating whether a response message is required.

2. The system of claim 1, wherein the connection type indicates one of a connection request, a connection confirm, a connection refuse, a data transfer, a connectionless data transfer, and an inactivity test.

3. A method for providing a signaling interface between a Base Station Controller (BSC) and a Mobile Switching Center (MSC) in a mobile communication system, comprising:
establishing a data link layer connection using a UDP/IP (User Datagram Protocol/Internet Protocol) between the BSC and the MSC; and
managing the connection by an A1 interface message using the UDP/IP, for connection control between the BSC and the MSC,
wherein the UDP/IP-based A1 interface message is configured to include a new field for managing a connection setup in addition to an existing A1 interface message, and
wherein the new field includes an A1 version indicating the version of the UDP/IP-based A1 interface message, a connection type describing the type of the connection setup, a destination key value for identifying a call destination, a source key value for identifying a call source, an address of the call source, a retransmission number, and information indicating whether a response message is required.

4. The method of claim 3, wherein the connection type indicates one of a connection request, a connection confirm, a connection refuse, a data transfer, a connectionless data transfer, and an inactivity test.

5. A method in a Mobile Switching Center (MSC) for providing a User Datagram Protocol/Internet Protocol (UDP/IP-based A1 interface in a mobile communication system, comprising:
establishing a data link layer connection using the UDP/IP with a Base Station Controller (BSC); and
managing the connection by an A1 interface message using the UDP/IP, for connection control with the BSC,
wherein the UDP/IP-based A1 interface message is configured to include a new field for managing a connection setup in addition to an existing A1 interface message, and
wherein the new field includes an A1 version indicating the version of the UDP/IP-based A1 interface message, a connection type describing the type of the connection setup, a destination key value for identifying a call destination, a source key value for identifying a call source, an address of the call source, a retransmission number, and information indicating whether a response message is required.

6. The method of claim 5, wherein the connection type indicates one of a connection request, a connection confirm, a connection refuse, a data transfer, a connectionless data transfer, and an inactivity test.

7. A method in a Base Station Controller (BSC) for providing a User Datagram Protocol/Internet Protocol (UDP/IP) based A1 interface in a mobile communication system, comprising:
establishing a data link layer connection using the UDP/IP with Mobile Switching Center (MSC); and
managing the connection by an A1 interface message using the UDP/IP for connection control with the MSC,
wherein the UDP/IP-based A1 interface message is configured to include a new field for managing a connection setup in addition to an existing A1 interface message, and
wherein the new field includes an A1 version indicating the version of the UDP/IP-based A1 interface message, a connection type describing the type of the connection setup, a destination key value for identifying a call destination, a source key value for identifying a call source, an address of the call source, a retransmission number, and information indicating whether a response message is required.

8. The method of claim 7, wherein the connection type indicates one of a connection request, a connection confirm, a connection refuse, a data transfer, a connectionless data transfer, and an inactivity test.

9. An apparatus in a Mobile Switching Center (MSC) for providing a User Datagram Protocol/Internet Protocol (UDP/IP) based A1 interface in a mobile communication system, comprising:
a communication module for communicating with another node; and
a controller for establishing a data link layer connection using the UDP/IP with a Base Station Controller (BSC) and managing the connection by an A1 interface message using the UDP/IP, for connection control with the BSC,
wherein the UDP/IP-based A1 interface message is configured to include a new field for managing a connection setup in addition to an existing A1 interface message, and
wherein the new field includes an A1 version indicating the version of the UDP/IP-based A1 interface message, a connection type describing the type of the connection setup, a destination key value for identifying a call destination, a source key value for identifying a call source, an address of the call source, a retransmission number, and information indicating whether a response message is required.

10. The apparatus of claim 9, wherein the connection type indicates one of a connection request, a connection confirm, a connection refuse, a data transfer, a connectionless data transfer, and an inactivity test.

11. An apparatus in a Base Station Controller (BSC) for providing a User Datagram Protocol/Internet Protocol (UDP/IP) based A1 interface in a mobile communication system, comprising:
- a communication module for communicating with another node; and
- a controller for establishing a data link layer connection using the UDP/IP with a Mobile Switching Center (MSC) and managing the connection by an A1 interface message using the UDP/IP, for connection control with the MSC,
- wherein the UDP/IP-based A1 interface message is configured to include a new field for managing a connection setup in addition to an existing A1 interface message, and
- wherein the new field includes an A1 version indicating the version of the UDP/IP-based A1 interface message, a connection type describing the type of the connection setup, a destination key value for identifying a call destination, a source key value for identifying a call source, an address of the call source, a retransmission number, and information indicating whether a response message is required.

12. The apparatus of claim 11, wherein the connection type indicates one of a connection request, a connection confirm, a connection refuse, a data transfer, a connectionless data transfer, and an inactivity test.

* * * * *